Feb. 27, 1962 J. P. GLASS ET AL 3,022,946
COUNTER REVERSING MECHANISM
Filed Aug. 21, 1957 5 Sheets-Sheet 1
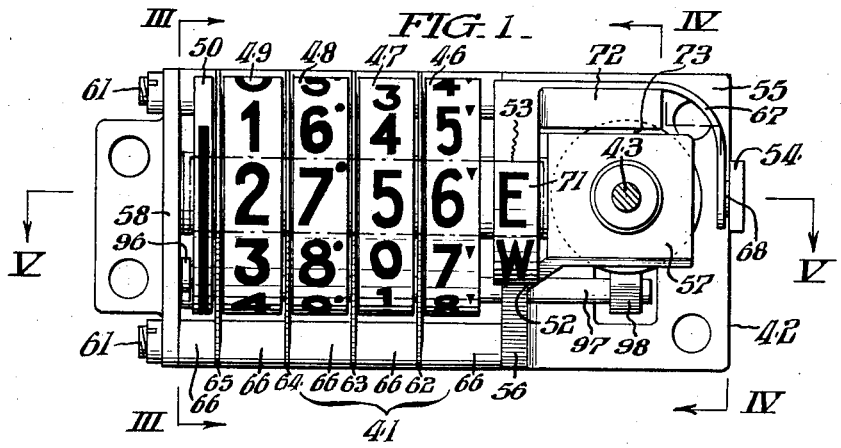
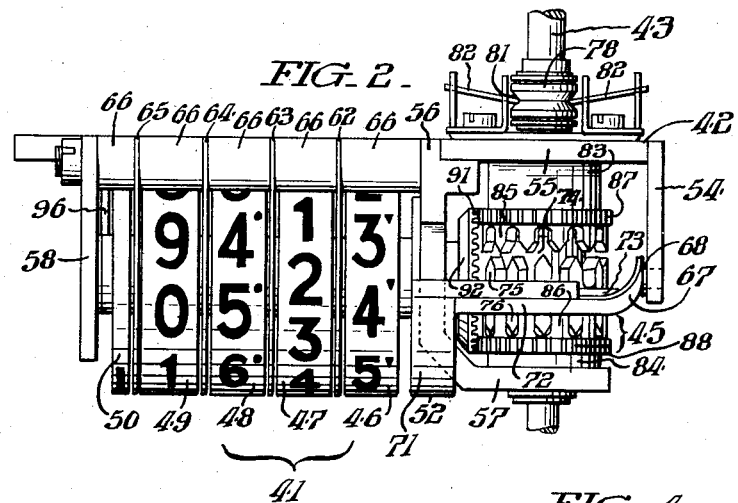
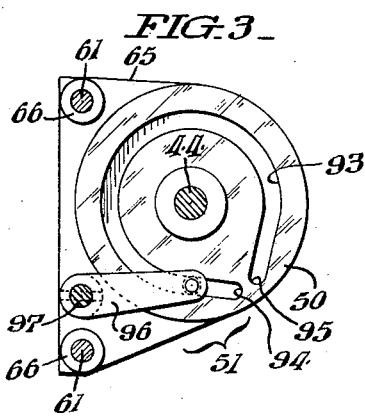
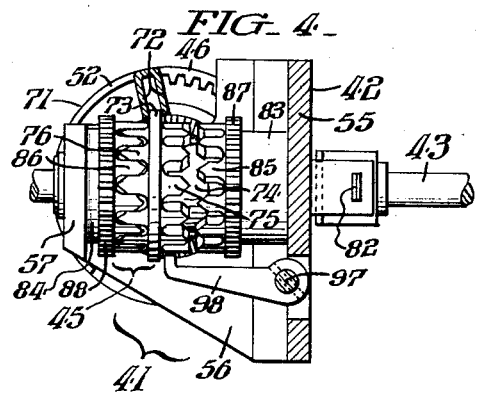
INVENTORS.
John P. Glass &
Frank Zaic,
BY Paul & Paul
ATTORNEYS

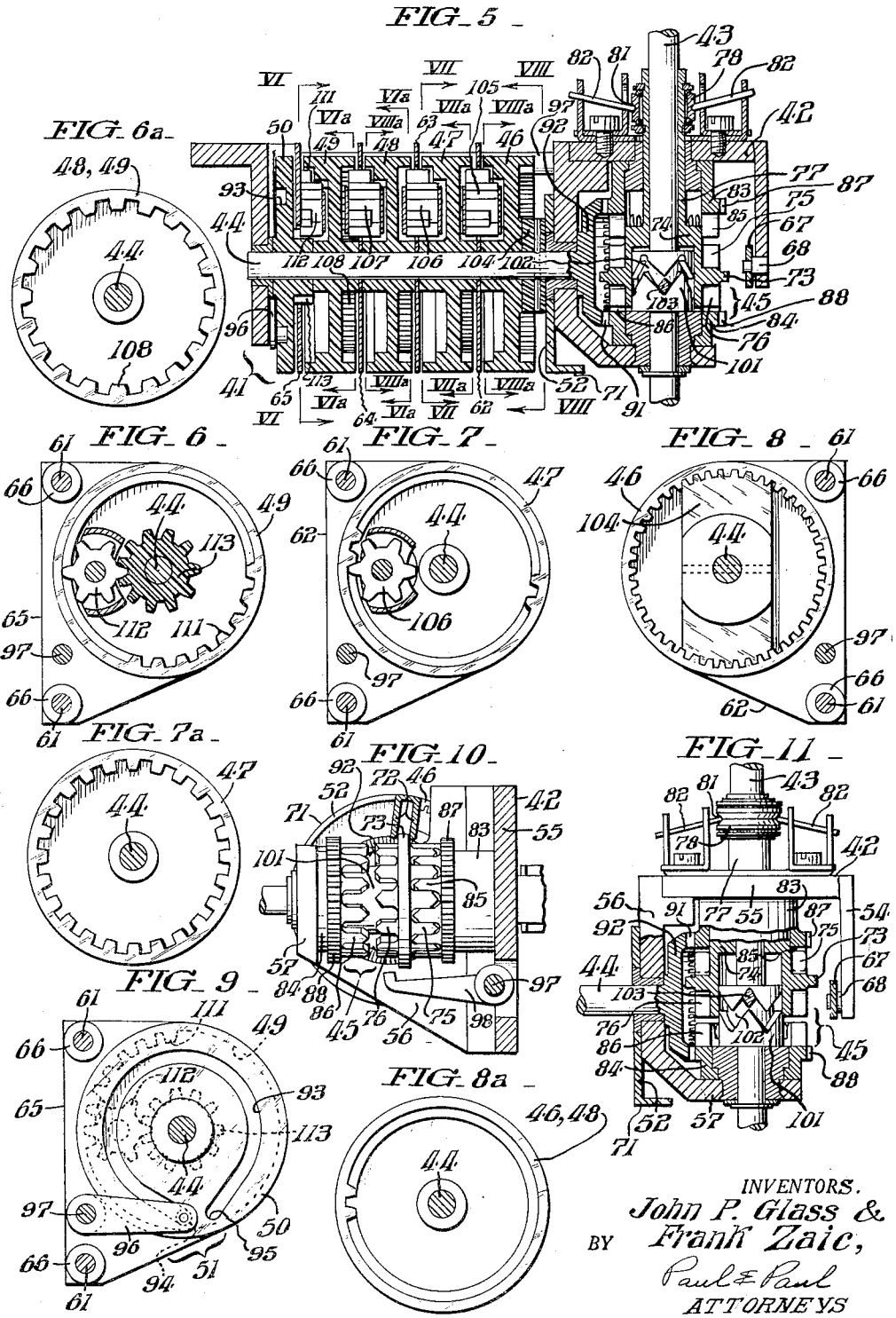

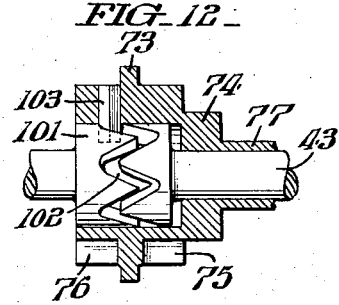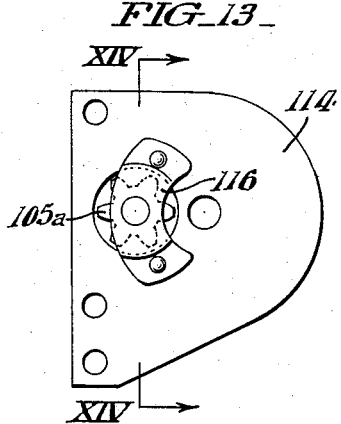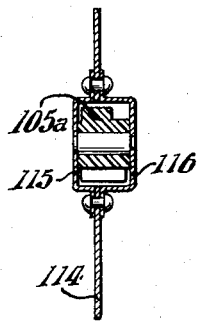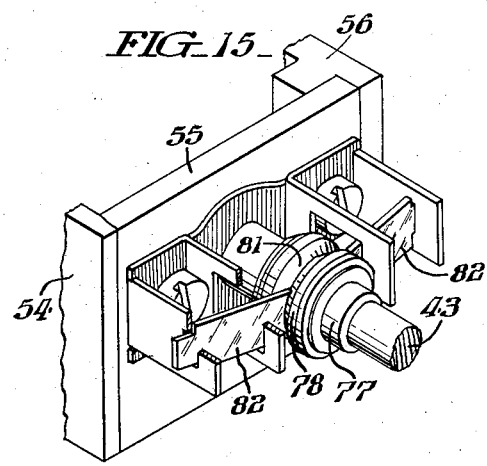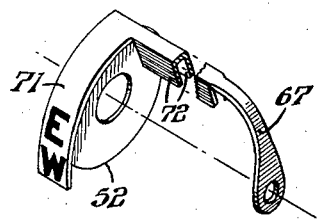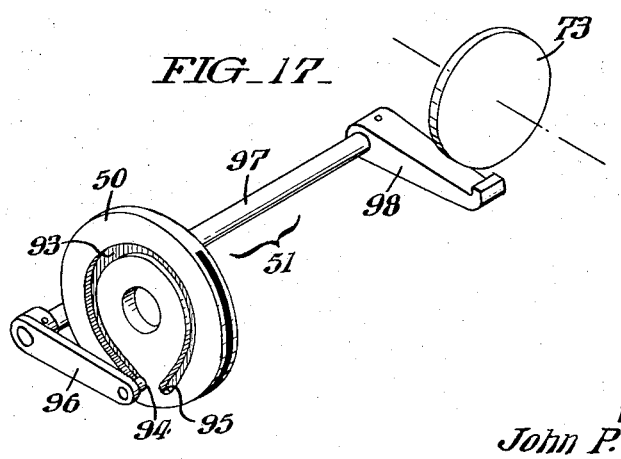
INVENTORS.
John P. Glass &
BY Frank Zaic,
Paul & Paul
ATTORNEYS

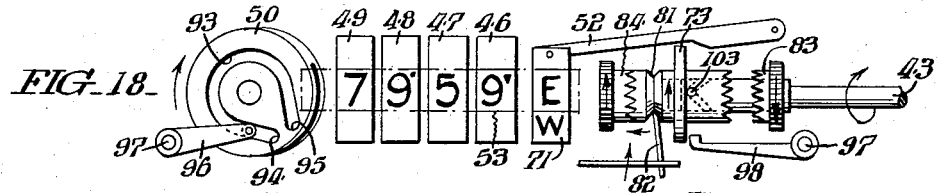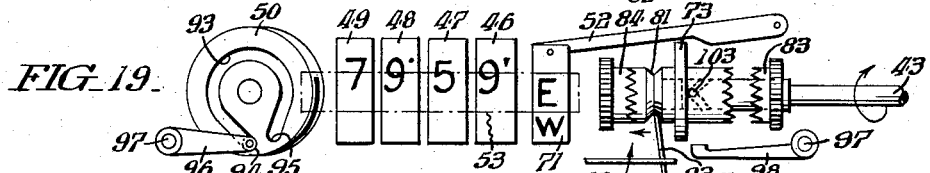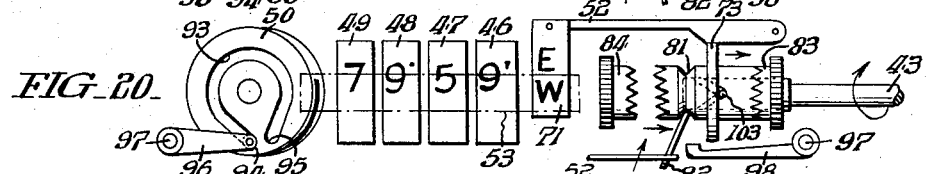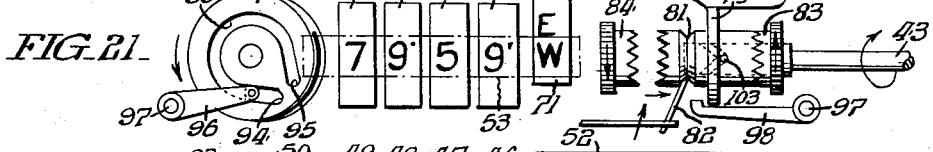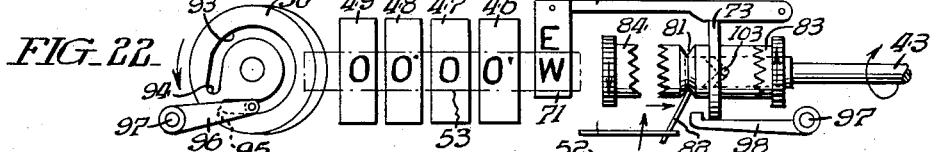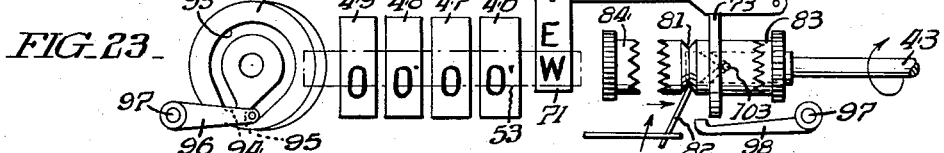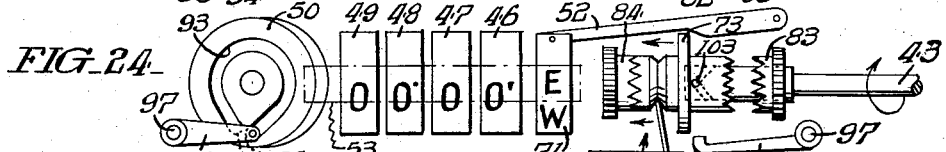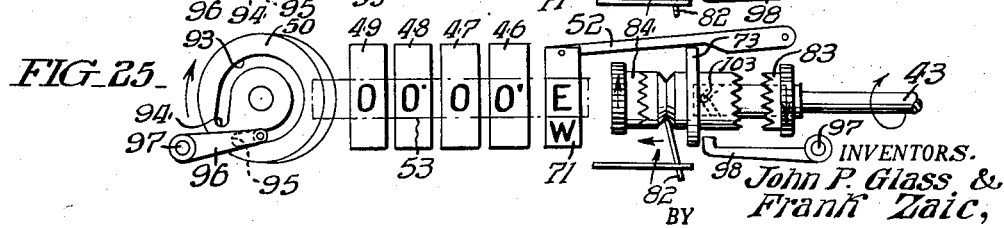

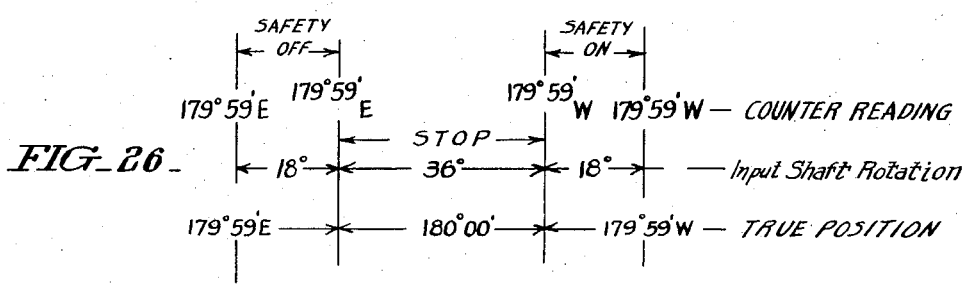
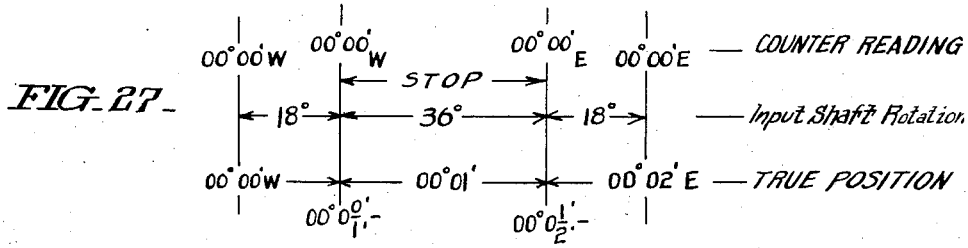
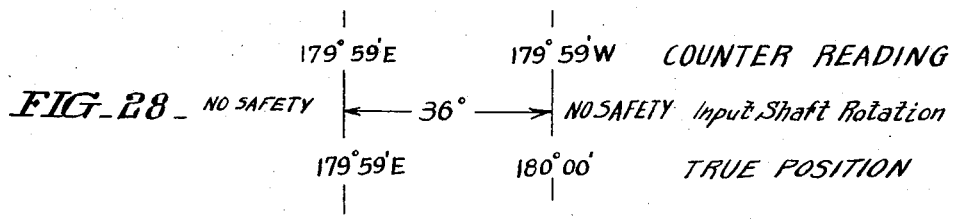
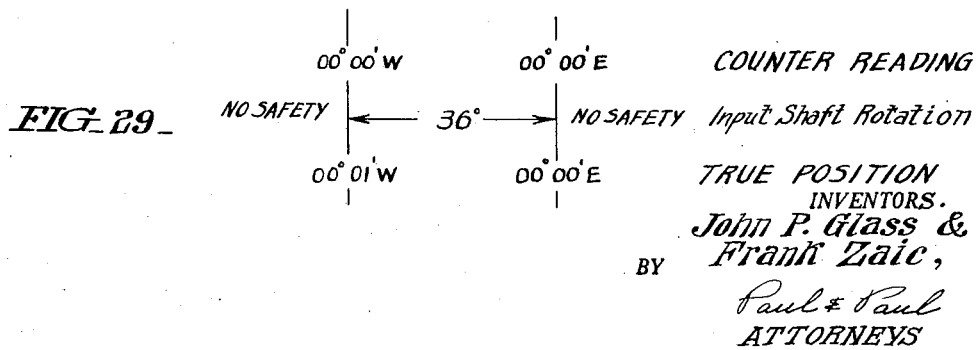

United States Patent Office 3,022,946
Patented Feb. 27, 1962

3,022,946
COUNTER REVERSING MECHANISM
John P. Glass, Ardmore, and Frank Zaic, Clifton Heights, Pa., assignors to Clifton Precision Products Co., Inc., Clifton Heights, Pa., a corporation of Delaware
Filed Aug. 21, 1957, Ser. No. 679,416
6 Claims. (Cl. 235—117)

This invention relates to a counter, and more particularly concerns a counter for indicating latitude or longitude.

It is an object of this invention to provide a visual indication of changes in angular measurement, in degrees of a circle or a globe. It is another object of this invention to provide a device which is especially suitable for indicating geographical position on the earth according to the conventional latitude and longitude grid system. It is another object of this invention to automatically indicate North or South latitude, or East and West longitude. It is another object to provide a counter which is accurate, of simple construction and economical to manufacture on a mass production basis.

Other objects and advantages of the invention will further become apparent hereinafter and in the drawings, in which:

FIG. 1 represents a view in front elevation of a counter constructed in accordance with this invention;

FIG. 2 represents a top plan view of the counter shown in FIG. 1;

FIG. 3 represents a view in section taken as indicated by the lines and arrows III—III which appear in FIG. 1;

FIG. 4 represents a view in section taken as indicated by the lines and arrows IV—IV which appear in FIG. 1;

FIG. 5 represents a view in section taken as indicated by the lines and arrows V—V which appear in FIG. 1;

FIG. 6 represents a view in section taken as indicated by the lines and arrows VI—VI which appear in FIG. 5;

FIG. 6a represents a view in section taken as indicated by the lines and arrows VIa—VIa which appear in FIG. 5;

FIG. 7 represents a view in section taken as indicated by the lines and arrows VII—VII which appear in FIG. 5;

FIG. 7a represents a view in section taken as indicated by the lines and arrows VIIa—VIIa which appear in FIG. 5;

FIG. 8 represents a view in section taken as indicated by the lines and arrows VIII—VIII which appear in FIG. 5;

FIG. 8a represents a view in section taken as indicated by the lines and arrows VIIIa—VIIIa which appear in FIG. 5;

FIG. 9 represents a view similar to FIG. 3 but at a different stage of operation;

FIG. 10 represents a view similar to FIG. 4 but at a different stage of operation;

FIG. 11 represents a view partly in section similar to that shown to the right in FIG. 5;

FIG. 12 represents an enlarged partial view of the shifting cam, cooperating pin and sliding clutch elements of the invention;

FIG. 13 represents a view in side elevation of the spacer and carry-over pinion, which are elements of the invention;

FIG. 14 represents a view in section taken as indicated by the lines and arrows XIV—XIV which appear in FIG. 13;

FIG. 15 represents a view in perspective of the spring mechanism of the clutch;

FIG. 16 represents a view in perspective of the hemisphere indicator;

FIG. 17 represents a diagrammatic view in perspective of the safety latch mechanism;

FIGS. 18 through 25 represnt diagrammatic views that illustrate the position of the elements as the mechanism is shifted from indicating one hemisphere to indicating another hemisphere; and FIGS. 26 through 29 compares counter reading with true position during the time the counter is shifting from indicating one hemisphere to indicating another.

Although specific terms are used in the following description for the sake of clarity, these terms are intended to refer only to the structure shown in the drawings and are not intended to define or limit the scope of the invention.

Turning now to the specific embodiment of the invention selected for illustration in the drawings, the number 41 designate generally a counter having a housing 42, an input shaft 43, an output shaft 44, a shiftable clutch mechanism 45, counter wheels 46–50 which are rotated through gear means by the output shaft 44, operating means 51 for shifting the shiftable clutch mechanism 45, and hemisphere indicating mechanism 52.

Input shaft 43 receives intelligence from a computer (not shown) which computes continuously the present relative longitude position of the airplane in which the counter is installed. This intelligence is transferred from input shaft 43 to the counter wheels through clutch mechanism 45 and output shaft 44. The counter indicates present longitude position through a window represented by the dot-dash line 53 in FIG. 1. Counter 41 indicates any longitude position from 179°59′ East through 00°00′ to 179°59′ West. It is important to note that when the counter passes from one hemisphere to another, the hemisphere indicating mechanism 52 changes appropriately, and the counter wheels reverse their direction of rotation while the input shaft rotation remains the same.

Housing 42 includes an end plate 54, a back plate 55, an intermediate plate 56, a front plate 57 and another end plate 58. End plate 58 is connected to intermediate plate 56 by connecting rods 61. Proper spacing is maintained through the use of spacers 62–65 and spacer rolls 66.

Hemisphere indicating mechanism 52 includes an arm 67 which is pivoted by pin 68 to end plate 54 and which extends to intermediate plate 56. Hemisphere indicating mechanism 52 is provided with a flag surface 71 which is rotatable about output shaft 44. Flag surface 71 has the indicating letters "E" and "W" inscribed thereon. Depending from arm 67 are flanges 72 which abut a ridge 73 of the shiftable clutch mechanism 45.

Freely mounted on input shaft 43 is a shiftable clutch element 74 which includes oppositely extending gear teeth 75 and 76, a sleeve 77 and a collar 78. Collar 78 is provided with a circumferential groove 81 in which rides one end of leaf springs 82 which are mounted on back plate 55. Also freely rotatable about input shaft 43 are pinions 83 and 84 which are provided with teeth 85 and 86 that mesh alternately with teeth 75 and 76 of shiftable clutch element 74. Pinions 83, 84 are also provided with teeth 87 and 88 which mesh with teeth 91 of a face gear 92 mounted on output shaft 44.

FIG. 3 illustrates the side elevation view of counter wheel 50 and shows cam groove 93, limit stops 94 and 95, cam follower arm 96 and shaft 97. Shaft 97 passes through intermediate plate 56 and has mounted on its opposite end a safety latch 98 which acts as a stop to prevent accidental shifting of ridge 73.

Referring now more particularly to FIG. 5, input shaft 43 is provided with a collar 101 having formed therein a zig-zag cam groove 102. Inside groove 102 is slidably positioned a pin 103 which extends inwardly from shiftable clutch element 74.

Fixed to output shaft 44 is a gear segment 104 (FIGS. 5 and 8) which transfers the rotation of input shaft 43 to counter wheel 46. The opposite side of wheel 46 is provided with an interior gear having two teeth (FIG. 8a). Wheel 46 has inscribed on its face the numerals from 0 to 9 and each rotation of first wheel 46 causes the two teeth to rotate a carry-over pinion 105 which in turn rotates counter wheel 47 one numeral. The face of counter wheel 47 in mesh with carry-over pinion 105 is provided with 24 teeth as is shown in FIG. 7a. The face of wheel 47 bears the numbers 0 through 5 and 0 through 5, since the highest number of minutes to be indicated is 60 minutes.

The left hand face of wheel 47 is provided with two sets of two teeth that mesh with a carry-over pinion 106. Since wheel 47 indicates the numeral 6 on two occasions during a complete revolution of wheel 47, the wheel 48 is advanced one numeral for every half revolution of wheel 47. The left hand side of wheel 48 is provided with an interior gear having two teeth, again as illustrated in FIG. 8a. These two teeth mesh with a carry-over pinion 107, which in turn meshes with interior gear 108 of wheel 49. Interior gear 108 is provided with 20 teeth and bears on its face the numbers from 0 to 9. The opposite side of wheel 49 is provided with an interior gear 111 which has 8 teeth and which meshes with a carry-over pinion 112. Carry-over pinion 112 meshes with a continuous exterior gear 113 of wheel 50. Wheel 50 bears on its face an elongated line that appears as the numeral 1 when seen through the window of the counter.

FIG. 9 is a view similar to FIG. 3 except that it shows cam follower arm 96 at the end of its travel in cam groove 93 at limit stop 94.

FIG. 10 is a view similar to FIG. 4 except that it shows shiftable clutch element 74 in engagement with pinion 83 instead of pinion 84, and shows safety latch 98 in disengaged position.

FIG. 11 shows the position of pin 103 when shiftable clutch element 74 is engaged with pinion 83. FIG. 11 also shows the position of collar 78, and leaf springs 82.

FIG. 12 is an enlarged view of input shaft 43, collar 101, zig-zag cam groove 102, and pin 103 extending from the interior of shiftable clutch element 74.

FIGS. 13 and 14 show on an enlarged scale the construction of the spacer elements with a spacer plate 114 and a carry-over pinion 105a rotatably attached to brackets 115 and 116 which are affixed to plate 114.

FIG. 15 shows in perspective and on a larger scale the details of the mechanism of collar 78 and leaf springs 82.

FIG. 16 shows a perspective view of hemisphere indicating mechanism 52.

FIG. 17 shows a diagrammatic view of operating means 51 for effecting the shifting of shiftable clutch mechanism 45.

The operation of the counter in passing from 179° 59′ E longitude to 179°59′ W longitude is illustrated diagrammatically in FIGS. 18 through 21. In passing through 180°, the counters rotate in one direction as they approach 180° and then rotate in the opposite direction as they recede from 180°. Yet the rotation of the input shaft remains the same. The reversal of the direction of the output shaft is accomplished by stopping the rotation of the counters and thus the rotation of the output shaft and its face gear 92. Face gear 92 being stationary, pinions 83 and 84 are also stationary. However, input shaft 43 continues to rotate and since shiftable clutch element 74 is pinned to the rotatable shaft by pin 103, shiftable clutch element 74 is rotated and shifted from one position in zig-zag groove 102 to the other position, thereby disengaging element 74 from one pinion and meshing it with the other pinion.

The sequence of operations is as follows. With shiftable clutch element 74 in engagement with pinion 84 the counter is approaching 179°59′ E. At this point the cam follower arm 96 is at the position shown in FIG. 18. It is at the point in cam groove 93 where cam groove 93 starts to bear outwardly. As follower arm 96 traverses this portion of the cam groove 93, the shaft 97 is rotated to rotate safety latch 98 clear of ridge 73. The mechanism advances from the position of FIG. 18 to the position of FIG. 19 as the input shaft rotates 18 degrees, and during this time the counter wheels rotate in unison to the half obscured position of FIG. 19.

Now, as indicated in FIG. 20, the counter wheels have stopped rotation causing the output shaft to stop which causes pinions 83, 84 to stop. Since the input shaft 43 is still rotating, shiftable clutch mechanism 45 must shift since it is pinned by pin 103 to zig-zag cam groove 102 of collar 101.

This shift of shiftable clutch element 74 is accomplished while the input shaft rotates 36°, as is indicated in FIG. 26. Since the clutch has shifted, now the counter wheels will rotate in the opposite direction and they will rotate in unison from the position of FIG. 20 to the position of FIG. 21. During this rotation safety latch 98 is returned to its safety position, and this is accomplished during a rotation of 18° of the input shaft. The shifting of shiftable clutch element 74 causes the shifting of hemisphere indicating mechanism 52 from East to West indicating position since flanges 72 of arm 67 abut ridge 73 and are controlled by the position of ridge 73.

The operation of the mechanism as the counter approaches 00°00′ is illustrated in FIGS. 22 through 25 and is diagrammatically explained in FIG. 27. In this case, in FIG. 22 the counter is reading 00°00′ West. Between the positions of FIG. 22 and FIG. 23 the counters have rotated in unison to a half-obscured position of the zero numerals and the safety latch 98 has lowered to its inoperative position. This is accomplished as the input shaft rotates 18°. During the 36° of rotation of the input shaft between FIG. 23 and FIG. 24, the output shaft is stopped, pinions 83 and 84 are stopped, and shiftable clutch element 74 shifts. Ridge 73 operates the hemisphere indicating mechanism 52 to show East instead of West. Between the positions of FIG. 23 and FIG. 24 the counter input shaft has rotated 36°.

Between the positions shown in FIG. 24 and FIG. 25 the input shaft rotates 18°, the counters rotate in unison back to show 00°00′ through the window, and the safety latch 98 is returned to its operative position.

As is shown in FIG. 26 and FIG. 27, 72° of input shaft rotation has been lost to the output shaft, during the release of the safety latch, the shifting of the clutch and the restoring of the safety to on position. This loss corresponds to 2 minutes of longitude. However, the counter reading coincides with the true position reading after the input shaft rotation has passed 179°59′ West.

On the other hand, as the input shaft rotation passes from 00°00′ West to 00°02′ East, the counter reading has lost 2 minutes. On reversing the procedure, by passing from 00°00′ East to 00°00′ West, the counter reading again will coincide with the true position.

FIGS. 28 and 29 compare computer reading with true position when no safety latch 98 is used. With no safety latch, cam follower stops are provided for cam groove 93 so that cam follower arm 96 stops rotation of the counter wheels when arm 96 reaches the position relative to wheel 50 as shown in FIG. 3. In this case only 36° of input shaft rotation is lost to the output shaft when the counter wheels reverse their direction of rotation relative to input shaft rotation.

It is to be understood that the form of the invention herein shown and described is to be taken as a preferred embodiment. Various changes may be made in the shape, size and arrangement of parts. Equivalent elements may be substituted for those described herein, parts may be reversed, and certain features of the invention may be utilized independently of the use of other features, all without departing from the spirit of the invention or the scope of the subjoined claims.

Having thus described our invention, we claim:

1. A counter for indicating angular movement comprising an input shaft, an output shaft, shiftable clutch means connected between the input and output shafts for transferring input rotation to the output shaft and for reversing the direction of output shaft rotation relative to input shaft rotation, counter wheels mounted on the output shaft, and means actuated by the counter wheels for shifting said clutch means to reverse the direction of output shaft rotation relative to input shaft rotation while maintaining the direction of rotation of said clutch means.

2. A counter for indicating angular movement comprising an input shaft, an output shaft, shiftable clutch means connected between the input and output shafts for transferring input rotation to the output shaft and for reversing the direction of output shaft rotation relative to input shaft rotation, counter wheels mounted on the output shaft, means operatively connected to said counter wheels for stopping counter wheel rotation, and means actuated by said counter wheels and said stopping means for shifting said clutch means to reverse the direction of output shaft rotation relative to input shaft rotation while maintaining the direction of rotation of said clutch means.

3. A counter for indicating angular movement comprising an input shaft, an output shaft, shiftable clutch means connected between the input and output shafts for transferring input shaft rotation to the output shaft and for reversing the direction of output shaft rotation relative to input rotation, counter wheels mounted on the output shaft, means actuated by the counter wheels for shifting said clutch means to reverse the direction of output rotation relative to input shaft rotation while maintaining the direction of rotation of said clutch means, and indicating means actuated by the clutch means for indicating reversal of output shaft rotation relative to input shaft rotation and comprising an annular flag positioned around said output shaft, a ridge formed on said shiftable clutch means, and a pivoted arm connected to said annular flag and said ridge.

4. A counter for indicating angular movement comprising an input shaft, an output shaft, shiftable clutch means connected between the input and output shafts for transferring input rotation to the output shaft and for reversing the direction of output shaft rotation relative to input shaft rotation, counter wheels mounted on the output shaft, means for shifting said clutch means to reverse the direction of output shaft rotation relative to input shaft rotation while maintaining the direction of rotation of said clutch means, and latching means operatively connected to said clutch means for preventing accidental disengagement of said clutch means, said latching means including one of said counter wheels directly mounted on said output shaft with a cam groove formed therein, a cam follower mounted on a latch shaft and positioned in said cam groove, said latch shaft extending toward said clutch mechanism, and a safety latch mounted on said shaft and operatively connected to said clutch means, whereby unwanted shifting of the clutch means is prevented by a ridge on said clutch means coming in contact with said safety latch.

5. A counter for indicating angular movement comprising an input shaft; an output shaft; shiftable clutch means connected between the input and output shafts for transferring input shaft rotation to the output shaft and for reversing the direction of output shaft rotation relative to input shaft rotation; counter wheels mounted on the output shaft; and means for stopping counter wheel rotation, shifting said clutch means to reverse the direction of output shaft rotation relative to input shaft rotation while maintaining the direction of rotation of said clutch means, and compensating for the input shaft rotation which is lost to the output shaft during the stoppage of counter wheel rotation said stopping, shifting, and compensating means including one of said counter wheels which is directly mounted on said output shaft with stop means connected thereto for stopping its rotation and thereby stopping rotation of said output shaft, a cam surface formed in said input shaft, and a pin extending from said clutch means into contact with said cam surface, whereby stoppage of rotation of said output shaft causes stoppage of rotation of said clutch means, and said cam surface of the rotating input shaft moves said pin to shift said clutch means.

6. A counter for indicating angular movement comprising an input shaft; an output shaft; shifting clutch means connected between the input and output shafts for transferring input shaft rotation to the output shaft and for reversing the direction of output shaft rotation relative to input shaft rotation; counter wheels mounted on the output shaft; means for shifting said clutch means to reverse the direction of output shaft rotation relative to input shaft rotation; indicating means operative in response to the shifting clutch means for indicating reversal of output shaft rotation relative to input shaft rotation; latching means operatively connected to said clutch means for preventing accidental disengagement of the clutch means; means actuated by the counter wheels for releasing said latching means to permit shifting of said clutch means; and means connected to said counter wheels for stopping rotation of said output shaft and shifting said clutch means to reverse the direction of rotation of said output shaft while maintaining the direction of rotation of said clutch means, and for compensating for the amount of input shaft rotation lost to the output shaft during the stoppage of rotation of said counter wheels.

References Cited in the file of this patent
UNITED STATES PATENTS

| | | |
|---|---|---|
| 2,269,330 | Andren et al. | Jan. 6, 1942 |
| 2,605,047 | Nyyssonen et al. | July 29, 1952 |
| 2,829,532 | Togstad | Apr. 8, 1958 |

FOREIGN PATENTS

| | | |
|---|---|---|
| 29,422 | Great Britain | Dec. 31, 1904 |